United States Patent [19]

Tortorici et al.

[11] 4,127,396
[45] Nov. 28, 1978

[54] AIR PRE-CLEANER

[75] Inventors: Domenic P. Tortorici, South Holland; Demetrios A. Tsengouras, Park Forest, both of Ill.

[73] Assignee: Halle Industries, Inc., New York, N.Y.

[21] Appl. No.: 820,010

[22] Filed: Jul. 28, 1977

[51] Int. Cl.² .............................................. B01D 45/16
[52] U.S. Cl. ........................................ 55/396; 55/426; 55/457
[58] Field of Search ................ 55/391, 394, 396, 399, 55/424, 426, 448, 456, 457

[56] References Cited
U.S. PATENT DOCUMENTS

| 1,742,564 | 1/1930 | Summers | 55/424 |
| 1,906,432 | 5/1933 | Summers | 55/457 |
| 2,322,414 | 6/1943 | Bowen | 55/396 |
| 2,763,245 | 9/1956 | Place | 55/396 |
| 3,374,857 | 3/1968 | Hutchins | 55/396 |
| 3,566,586 | 3/1971 | Langness | 55/457 |
| 3,885,935 | 5/1975 | Notter | 55/424 |
| 4,008,059 | 2/1977 | Monson et al. | 55/448 |

Primary Examiner—Frank W. Lutter
Assistant Examiner—David L. Lacey
Attorney, Agent, or Firm—Kinzer, Plyer, Dorn & McEachran

[57] ABSTRACT

An air pre-cleaner without moving parts including a housing having an inlet end for entrant air, an outlet end and a receiving chamber in between, wherein a feeder screw centrifuges the entrant air and moves it into a settling chamber where the dirt particles settle while the lighter air mass is directed to the outlet.

4 Claims, 3 Drawing Figures

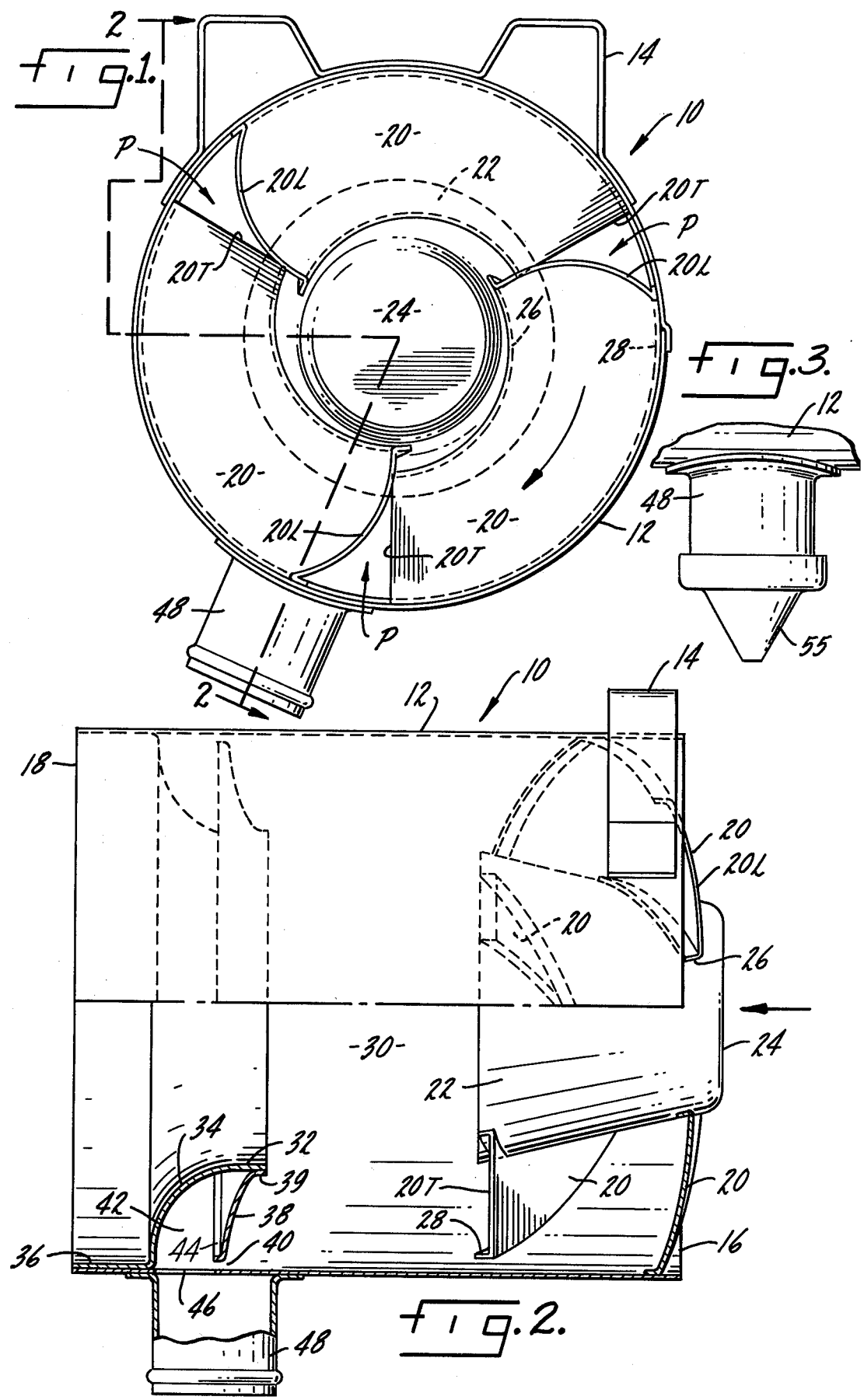

AIR PRE-CLEANER

This invention relates to an air pre-cleaner and in particular one to be installed upstream of the main air cleaner of an internal combustion engine so as to remove airborne dirt particles, before the air stream reaches the main filter. The cleaner may be used with an air compressor as another example.

The primary object of the present invention is to construct an air pre-cleaner, without moving parts, but which nonetheless centrifuges entrant air and feeds it downstream through a narrow passage into a settling chamber where the air velocity is reduced, without creating eddy currents, resulting in settling (separation) of the dirt particles entrained in the centrifuged stream.

Specifically the objects of the present invention are to both centrifuge and impart direction to the air by means of stationary helical vanes supported inside a circular housing by a truncated cone which slopes radially inward in the direction of the entrant air end of the housing, thereby directing the air downstream against an annular baffle so suspended inside the housing as to afford an annular space into which the centrifuged dirt-laden air is directed; the baffle is suspended by an annular horn-shaped end wall which cooperates with the baffle to define a dirt settling chamber where there are no eddy currents likely to keep the dirt entrained, while allowing egress for the cleaner, lighter air in the center or vortex of the air stream. In the drawing:

FIG. 1 is an end view of an air pre-cleaner constructed in accordance with the present invention;

FIG. 2 is a view taken on the line 2—2 of FIG. 1, partly in elevation and partly in section;

FIG. 3 is a detail view showing a dust unloader in operative position.

The air pre-cleaner 10 comprises an elongated, hollow, circular housing 12 having a bracket 14 by which the cleaner may be supported adjacent the main air filter of an automotive engine. Typically, the installation will be associated with a farm tractor or an earth moving vehicle where air may contain a large proportion of dirt particles. The bracket 14 is shown as positioned at the inlet end 16 of the housing but it could just as well be positioned at the outlet or downstream end 18 which will be communicated to the regular air intake filter of the engine, not shown.

Entrant air is both centrifuged and directed toward the outlet end of the housing by a helix or feeder screw positioned at the open inlet end of the housing. The screw in the present form comprises helical vanes 20, each having a leading edge 20L and a trailing edge 20T, preferably three in number. The vanes, like all other parts, are of sheet metal; they are welded in equally spaced circumferential relation on a truncated supporting cone 22. The vanes, on the other hand, are separated axially on the support cone to afford three passages P therebetween for air directed downstream by the vanes.

The cone 22 has its base positioned inward of the housing and its nose 24 pointing in the direction of the entrant air. Thus, the outer surface of the support cone slopes radially inward and forward in the direction of the air inlet. There are no moving parts and to this end the cone sub-assembly, with the vanes secured thereto, may be press-fitted into the inlet end of the housing, or this sub-assembly may be secured in place by spot welds between the inner surface of the housing and the radial outer edge of the helical vanes 20.

To neatly fit the vanes to the opposing surfaces of the cone and housing, the vanes have bent-over flanges 26 engaging the support cone surface and similar bent-over flanges 28 conforming to the radius of the housing 12. The wall of the cone may have a slope of about 12°; the lead angle of the vane may be about 22°. In any event, the slope is such and the helical pitch is such that the stream of entrant air, striking the leading faces of the vanes, follows the ramps presented by the vanes and is directed thereby both radially outwardly and downstream toward the outlet end of the housing.

The housing has an unoccupied chamber 30 between the outlet end and the cone. The centrifuged air is directed through the passages P into this chamber. The dirt particles naturally reside in the outer orbit of chamber 30; the cleaner, lighter air fraction is naturally at the center or vortex and this fraction moves through an outlet duct 32 presented by a funnel-shaped end wall member 34 having a circular flange 36 fitting the inside diameter at the outlet end of the housing, where it may be welded or press-fitted in place with the narrow duct end 32 pointing upstream toward the receiving chamber 30.

The end wall member 34 also serves as a support for a continuous annular baffle 38, in the manner shown. Thus, the baffle has a flange 39 complementally fitted to the outlet duct 32. The baffle is curved radially outwardly away from duct 32 and has a smaller outer diameter than the inside diameter of housing 12 thereby to afford an annular space 40 at the rear of chamber 30. The annular space 40 communicates of course with the outside path or orbit of the dirt particles in chamber 30, which escape through the passage 40 into an annular expansion chamber 42 behind the baffle. The air thus swept into the expanison chamber will not recirculate back in any appreciable degree.

The baffle 38 may be stabilized by a strut in the form of a ring 44 welded to wall 34 along with baffle 38.

The expansion chamber 42 is limited at one end by the end wall 34 and at the other end by the annular strut 44. End wall 34 is preferably curved so that eddy currents will not be produced when the dirt-laden air impinges thereon. The housing 12 encompasses the expansion chamber except for a port 46 communicating with a fitting 48 which may be connected to an aspirator, duct unloader, compressed air ejector, or electrically driven aspirator.

As the air traverses passage 40 its velocity is reduced, and is further reduced when impinging on wall 34. Consequently, the dirt settles (is disentrained) in the expansion chamber.

The unit may be used in any position. Indeed, the port 46 may represent a mere gravity drop for the dirt particles, in a simplified horizontal installation, or where this is not possible the fitting 48 may be connected to a muffler aspirator or to the unloader valve of an air compressor.

It will be seen from the foregoing the cleaner has no moving parts. Both the cone and funnel-shaped wall 34 are centered on the axis of the housing so that the entrant air moves uniformly through the slots or passages P in the direction of the receiving chamber 30, the dirt particles being centrifuged so they move toward the baffle 38 while the lighter air mass naturally follows the path of least resistance through the axially located duct 32 leading to the outlet. The escape path 40 is restrictive, preventing counter-flow which is minimal because there is loss of velocity in the expansion chamber 42 with consequent settling of the dirt, removeable by gravity or otherwise through port 46. The curved surface of wall 34, facing the expansion chamber 42, helps to prevent eddy currents likely to keep the dirt swirling.

While a bracket 14 has been shown it will be appreciated this manner of attachment need not be used and indeed the manner of attachment will vary widely depending upon the type of vehicle. Also, a rubber dust unloader 55, FIG. 3, may be attached to the fitting 48; the unloader is known and performs in the manner described in U.S. Pat. No. 4,006,000. The fitting 48 may be straight or elbow-shaped, depending on the position of the pre-cleaner when installed (horizontal or upright) as long as the unloader points downward.

We claim:

1. A pre-cleaner comprising a circular hollow housing presenting an open end for entrant air and an internal receiving chamber behind said open end for receiving the entrant air, an air feeder screw supported within the open end of the housing on a downward slope in the direction of the open end so as to feed entrant air centrifugally outwardly and rearwardly into said receiving chamber, an annular baffle at the rear of said chamber so supported within the housing as to define an annular space through which the centrifuged air may pass rearwardly, a funnel-shaped wall having an outer edge fitted to the inside diameter of the housing behind the baffle and defining therewith an annular expansion chamber into which the dirt-laden air is swept with consequent loss of velocity and settling of the dirt entrained therein, said funnel-shaped wall having an open forward edge so as to define an outlet duct for the cleaner air in the center of the receiving chamber and a curved wall at the rear of the expansion chamber to reduce eddy currents in the expansion chamber, and means communicating with said expansion chamber to enable dirt to be removed from the expansion chamber.

2. A pre-cleaner according to claim 1 in which the screw comprises a plurality of helical vanes supported equidistantly on a cone which is sloped radially inwardly in the direction of the entrant end of the housing, and said vanes and said funnel-shaped wall having bent outer flanges fitted to the inside diameter of the housing.

3. A pre-cleaner according to claim 2 in which the vanes and the baffle have bent inner flanges fitted respectively to the cone and the funnel-shaped wall.

4. A pre-cleaner according to claim 3 wherein the baffle is curved radially outwardly and concavely away from the outlet duct, and said baffle being stabilized by an annular strut supported by the funnel-shaped wall.

* * * * *